United States Patent
Guo et al.

(10) Patent No.: US 8,851,264 B2
(45) Date of Patent: Oct. 7, 2014

(54) ROLLER FOR CONVEYING GLASS SUBSTRATE AND ROLLER AXLE ASSEMBLY

(75) Inventors: Zhenhua Guo, Guandong (CN); Chunhao Wu, Guandong (CN); Kunhsien Lin, Guandong (CN); Yunshao Jiang, Guandong (CN); Yongqiang Wang, Guandong (CN); Xiande Li, Guandong (CN); Weibing Yang, Guandong (CN); Minghu Qi, Guandong (CN); Zenghong Chen, Guandong (CN); Zhiyou Shu, Guandong (CN)

(73) Assignee: Shenzhen China Star Optoelectronics Technology Co. Ltd, Shenzhen, Guangdong (CN)

(*) Notice: Subject to any disclaimer, the term of this patent is extended or adjusted under 35 U.S.C. 154(b) by 0 days.

(21) Appl. No.: 13/695,032

(22) PCT Filed: Aug. 14, 2012

(86) PCT No.: PCT/CN2012/080121
§ 371 (c)(1),
(2), (4) Date: Oct. 28, 2012

(87) PCT Pub. No.: WO2014/019257
PCT Pub. Date: Feb. 6, 2014

(65) Prior Publication Data
US 2014/0034444 A1    Feb. 6, 2014

(30) Foreign Application Priority Data
Aug. 3, 2012  (CN) .......................... 2012 1 0274689

(51) Int. Cl.
*B65G 13/00* (2006.01)
*B65G 49/06* (2006.01)
*B65G 39/02* (2006.01)

(52) U.S. Cl.
CPC ............... *B65G 13/00* (2013.01); *B65G 39/02* (2013.01); *B65G 49/06* (2013.01)
USPC .............................. 193/37; 193/35 R; 474/96

(58) Field of Classification Search
USPC ......... 193/35 R, 37; 198/842; 474/96; 301/30
See application file for complete search history.

(56) References Cited

U.S. PATENT DOCUMENTS 569,663 A * 10/1896 Perkins ........................... 474/95
1,758,280 A *  5/1930 Evans .............................. 193/37
(Continued)

FOREIGN PATENT DOCUMENTS

JP         2003089419 A      3/2003

*Primary Examiner* — Douglas Hess
(74) *Attorney, Agent, or Firm* — Andrew C. Cheng

(57) ABSTRACT

The present invention discloses a roller for conveying glass substrate. The roller includes a structure of roller body that is formed by assembling a plurality of roller components together in a disassembleable manner. An axle bore is formed in center of the roller. The present invention also discloses a roller axle assembly for conveying glass substrate, which includes a plurality of rollers and a roller axle. A distance is formed between adjacent ones of the rollers. Each of the plurality of rollers is individually disassembleable. The roller for conveying glass substrate and the roller axle assembly according to the present invention allows any one of the rollers that are mounted to a roller axle assembly to be disassembled individually thereby shortening the time period for replacing the glass substrate roller, increasing the utilization rate of the roller, and lowering down the device maintenance cost.

1 Claim, 3 Drawing Sheets

(56) References Cited

U.S. PATENT DOCUMENTS

| | | | |
|---|---|---|---|
| 1,829,973 A * | 11/1931 | Wilkinson | 198/845 |
| 4,402,390 A * | 9/1983 | Feeney | 193/37 |
| 5,117,970 A * | 6/1992 | Gibbs | 198/842 |
| 5,378,203 A * | 1/1995 | Baebel | 474/96 |
| 5,630,669 A * | 5/1997 | Stewart | 384/570 |
| 5,868,036 A * | 2/1999 | Salzman | 74/450 |
| 5,964,337 A * | 10/1999 | Hallahan | 198/780 |
| 6,540,068 B1 * | 4/2003 | Wesson et al. | 198/843 |
| 6,698,580 B2 * | 3/2004 | Diego | 198/588 |
| 6,758,776 B2 * | 7/2004 | Fye et al. | 474/95 |
| 8,327,614 B1 * | 12/2012 | Tegeler et al. | 59/4 |

* cited by examiner

ROLLER FOR CONVEYING GLASS SUBSTRATE AND ROLLER AXLE ASSEMBLY

CROSS REFERENCE TO RELATED APPLICATIONS

This application claims the priority of Chinese Patent Application No. 201210274689.8 filed on Aug. 3, 2012, the disclosure of which is incorporated herein by reference in its entirety.

BACKGROUND OF THE INVENTION

1. Field of the Invention

The present invention relates to the field of liquid crystal panel manufacturing, and in particular to a roller for conveying glass substrate and a roller axle assembly.

2. The Related Arts

In the field of liquid crystal panel manufacturing, rollers and roller axle assemblies are often used in the process of conveying glass substrates, wherein the conveyance of the glass substrates are carried out by means of the frictional force induced between the bodies of the rollers and the glass substrates.

The conventional roller axle assembly generally comprises a roller axle and multiple rollers that are sequentially fit to the roller axle. Such a structure of roller axle assembly has the following drawbacks.

(1) When the roller axle assembly suffers local wears, the entire roller must be replaced. In other words, the entire roller axle assembly must be completely disassembled and then re-assembled in the replacement operation. Such a process of maintenance consumes a great amount of labor and material and affects the manufacture.

(2) The roller is often provided with an elastic ring. The above described roller axle assembly does not allow the entire structure to be easily disassembled and may affect the replacement of the elastic ring. In case that the elastic ring is not timely replaced, the roller may not have sufficient precision for the size thereof, or the surface of the roller is not smooth enough and may cause scratching on the surface of a glass substrate, affecting product quality.

SUMMARY OF THE INVENTION

The technical issue to be addressed by the present invention is to a roller for conveying glass substrate and a roller axle assembly, which allow an individual roller that is secured on the roller axle assembly to be independently disassembled thereby shortening the time period required for replacing glass substrate roller, improving the utilization rate of the roller, and lowering down device maintenance cost.

The technical solution of the present invention is as follows.

A roller for conveying glass substrate comprises a structure of roller body that is formed by assembling a plurality of roller components together in a disassembleable manner. An axle bore is formed in center of the roller.

Preferably, at least one of the plurality of roller components comprises: an outer roller rim; an axle bore section defined in the outer roller rim; and a mounting section extending from a surface of the outer roller rim in a direction along the axle bore section;

wherein in assembling the plurality of roller components, the plurality of roller components are secured together through the mounting section, the outer roller rim of the plurality of roller components being assembled to form a roller rim of the structure of the roller body, the axle bore section of the plurality of roller components being assembled to form the axle bore.

Preferably, the mounting section forms a plurality of coupling holes for coupling the plurality of roller components.

Preferably, the outer roller rim and the mounting section are integrally formed together.

Preferably, the roller comprises two roller components that are symmetric and have semicircular ring-like cross section; and fasteners are sequentially put through the coupling holes of the two roller components that correspond to each other to secure the mounting section of the two roller components.

Preferably, the roller comprises at least two roller components having a cross-section that is a sector; and fasteners are sequentially put through the coupling holes of the two roller components that correspond to each other to secure the mounting section of the two roller components so that the outer roller rim and the axle bore section of the roller components are assembled to respectively form the roller having a complete circumferential contour.

Preferably, the roller has an outer circumference over which an elastic body is fit.

Preferably, the outer roller rim has a curved outer flange forming a receiving groove, and the elastic body is received in the receiving groove.

The present invention also discloses a roller axle assembly for conveying glass substrate, which comprises a plurality of rollers and a roller axle. The plurality of rollers is respectively mounted to the roller axle in such a way that a distance is formed between adjacent ones of the rollers. Each of the plurality of rollers is individually disassembleable.

Preferably, each of the rollers has the structure of roller for conveying glass substrate as discussed above.

The roller for conveying glass substrate and the roller axle assembly according to the present invention have the following advantages. Since the roller comprises a roller structure composed of a plurality of roller components that is assembled together, it is possible to realize disassembleable mounting to the roller axle. When a local roller is worn out, there is no need to completely disassembled and re-assembled the entire roller axle assembly and it only needs to remove the worn-out roller for replacement. This shortens the time period for replacing the glass substrate roller, increases the utilization rate of the roller, and lowers down the device maintenance cost. An elastic body is mounted t the roller to prevent insufficiency of size precision of the roller or surface unsmoothness of the roller that causes scratching of the surface of the glass substrate so that the roller provides an effect of shock absorption and cushioning.

DETAILED DESCRIPTION OF THE PREFERRED EMBODIMENTS

A description will be given to a preferred embodiment of the present invention with reference to the attached drawings.

Figure 1:
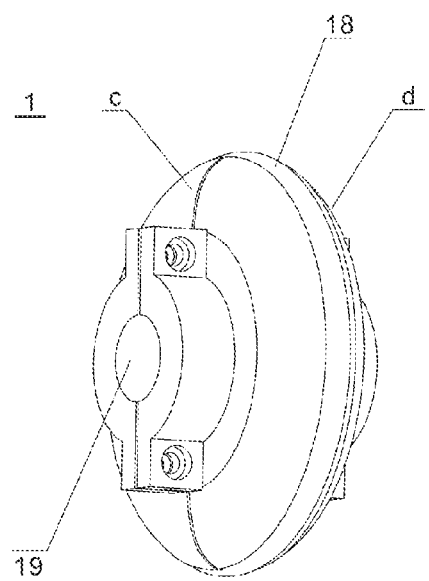
FIG. 1 is a perspective view showing a roller for conveying glass substrate according to an embodiment of the present invention.

Referring to FIG. 1, the present invention provides a roller for conveying glass substrate. The roller 1 has a structure of roller body that is formed by assembling a plurality of roller components 11 together.

The roller body has an outer contour that is a complete circular circumference and has a function of rotating about an axle.

The plurality of roller components 11 are assembled to form the structure of the roller 1 so that the roller 1 that is associated with and used in conveyance facility can be disassembled whereby when it is damaged, it can be easily disassembled and replaced with a new roller.

Figure 2:
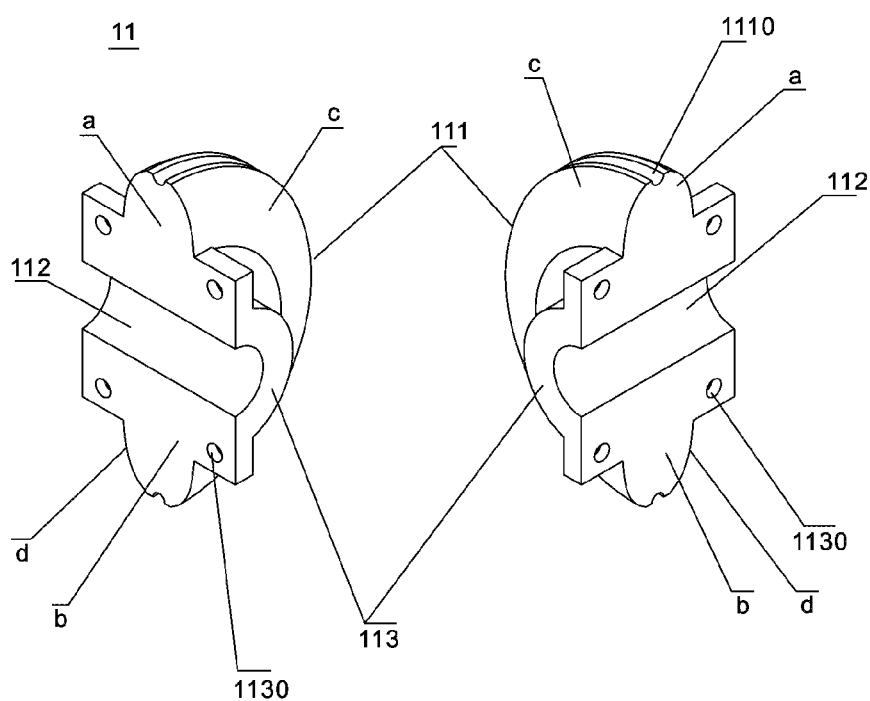
FIG. 2 is a perspective view showing roller components of the roller for conveying glass substrate according to the embodiment of the present invention.

Referring to FIG. 2, an embodiment of the disassembleable roller is as follows:

Each roller component 11 includes an outer roller rim 111, an axle bore section 112 defined in the outer roller rim 111, and mounting sections 113 extending from surfaces of the outer roller rim 111 in a direction along the axle bore section 112.

The outer roller rims 111 form a complete circular roller rim 18 after the roller components 11 are assembled together and effects friction conveyance of glass substrates when the roller rim 18 is set rotating about an axle.

The axle bore sections 112 form a complete axle bore 19 after the roller components 11 are assembled together to receive and retain a roller axle.

The mounting sections 113 are provided for coupling and fixing the plurality of roller components 11. The coupling may include, but not limited to, snap-on connection, pinned connection, or bolted connection.

In practice, the outer roller rim 111 are strangely-shaped structures having a cross-section (a section normal to the axle bore section 112) that is a semicircle or a sector having a predetermined thickness and has end faces a, b having an arch shape with a raised center and two lowered sides. The axle bore section 112 is set at middle between the two end faces a, b of the outer roller rim 111 in the form of a cutoff. The plurality of axle bore sections 112 that mates each other collectively form a complete axle bore 19. The mounting sections 113 are arranged to extend from surfaces c of the outer roller rim 111 in a direction along a central axis of the axle bore section 112 and can be regarded as projections formed on the surfaces c of the outer roller rim 111 at the two end faces a, b, whereby with the projections being jointed to each other, the adjacent end faces a or end faces b of the outer roller rims 111 of the roller components 11 can be coupled together.

One embodiment of coupling and fixing through the mounting sections 113 described above will be further discussed as follows.

The mounting sections 113 are respectively formed on the two side surfaces c, d of the outer roller rim 111 at the two end faces a, b and are each provided with coupling holes 1130 (four being shown in the drawings) for assembling and coupling the roller components 11. The condition of arranging the coupling holes 1130 is that when the end faces a or the end faces b of the two roller components 11 are jointed to each other, the outer roller rims 111 and the axle bore sections 112 of the two roller components 11 can mate each other and the coupling holes 1130 at the two sides can coincide each other. In practice, when fasteners, such as bolts, are sequentially set through the coincident coupling holes 1130, the two roller components 11 can be secured together.

It is appreciated that the mounting sections 113 can be arranged as two separate raised structured formed on one side surface c of the outer roller rim 111 at the two ends a, b, such as two individual raised blocks provided on the same side of the end face for connection purpose. Alternatively, two separate raised structures are formed on each of the two opposite side surfaces c, d of the roller components 11 at the two end faces a, b, such as four individual raised blocks provided on the two sides of the end face for connection purposes.

Another embodiment of the above descried roller components 11 will be discussed.

The outer roller rim 111 is integrally formed with the mounting sections 113. The axle bore section 112 is formed in the middle between two cross-sectional end faces a, b of each roller component 11. The purpose is to reduce the mold cost for the roller components 11, eliminate assembling of the structural components, and reduce assembling cost. Further, the integrally formed roller components 11 allow the roller to be subjected to uniform application of force and the transmission of force is clear, thereby extending the lifespan of the roller.

Figure 4:
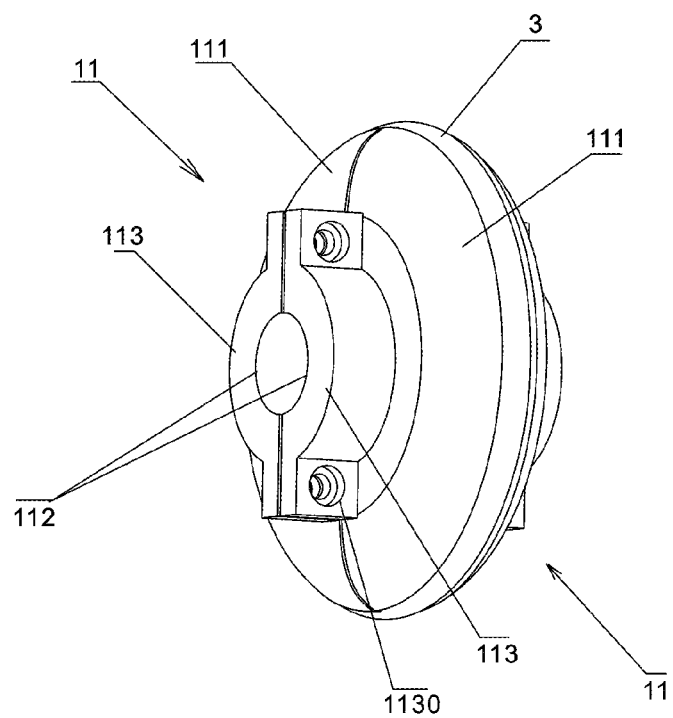
FIG. 4 is a perspective view showing the roller for conveying glass substrate according to the embodiment of the present invention with the elastic body mounted thereto.
Figure 5:
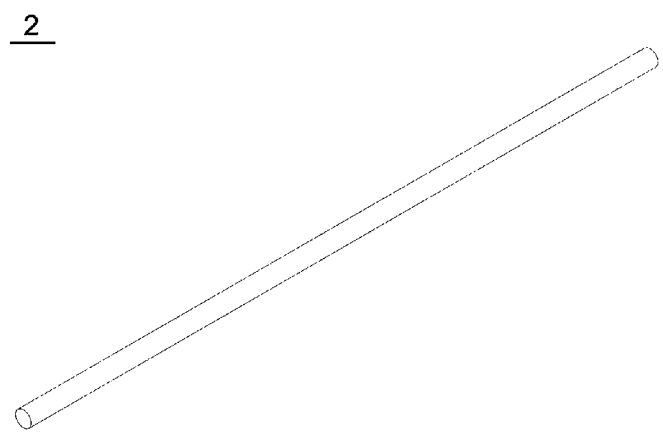
FIG. 5 is a perspective view showing a roller axle of a roller axle assembly for conveying glass substrate according to an embodiment of the present invention.

Referring to FIGS. 2 and 4, a preferred embodiment of the roller for conveying glass substrate according to the present invention will be discussed.

The roller components 11 are two members that are symmetric and have semicircular ring-like cross section. The cross-sectional end faces a, b of the two roller components 11 can mate each other to form a complete roller. In practice, the two outer roller rims 111 of the roller components 11 mate each other to form a complete circular roller rim 18. The two axle bore sections 112 mate each other to form the axle bore 19. The coupling holes 1130 of the mounting sections 113 coincide with each other, whereby bolts are allowed to put through the coupling holes 1130 and secured to joint the two roller components 11.

To disassemble the roller 1, a reversed process is carried out to realize disassembling.

It is appreciated that the roller 1 is not limited to such an arrangement of assembling two roller components 11 and alternatively, three, four, or more pieces of the roller components 11 can be used for assembling to form the roller. Apparently, the shape of the roller components 11 is not limited to be symmetric or identical and it only needs that the end faces a, b of the two roller components 11 are provided with the mounting sections 113 that can be fixed together in order to form a roller body with a axle bore 19.

Another preferred embodiment of the roller for conveying glass substrate according to the present invention will be described as follows.

Figure 3:
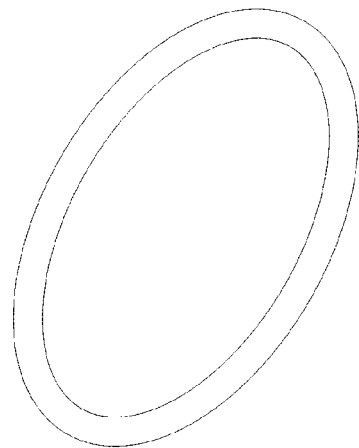
FIG. 3 is a perspective view showing an elastic body of the roller for conveying glass substrate according to the embodiment of the present invention.

The roller 1 comprises an elastic body 3 fit over the outer circumference thereof. As shown in FIGS. 3 and 4, the elastic body 3 is a ring structure made of an elastic material in such a form that leading and tail ends are jointed to each other and is deformable when acted upon by an external force. The elastic body 3 can prevent insufficiency of size precision of the roller 1 or surface unsmoothness of the roller 1 that cause scratching of the surface of the glass substrate so that the roller 1, when used in a conveyance device, provides an effect of shock absorption and cushioning.

An embodiment of assembling the elastic body 3 will be described.

The outer roller rim 111 has an outer flange (which is the raised portion at the middle of the end faces a, b of the outer roller rim 111) that forms a receiving groove 1110. When the plurality of roller components 11 is assembled together by following the above described manner, the receiving grooves 1110 of the roller components are jointed to each other to form a circumferential groove in which the elastic body 3 is received.

Further, the structure of the roller that is formed by assembling the plurality of roller components 11 as described above provides an unexpected technical advantage in replacing the elastic body 3. When the elastic body 3 is worn out, after the roller components 11 are disassembled, the elastic body 3 can be directly removed for replacement, this being convenient and efficient.

The present invention also discloses a roller axle assembly for conveying glass substrate, which comprises a plurality of rollers 1 and a roller axle 2. The plurality of rollers 1 is each removably mounted and secured to the roller axle 2 in such a way that adjacent ones of the rollers 1 are spaced from each other by a predetermined distance. In one embodiment, the distance is a fixed distance.

By adopting such a disassembleable roller structure, when a local roller gets worn out, there is no need to completely disassembled and re-assembled the entire roller axle assembly and it only needs to remove the worn-out roller for replacement. This shortens the time period for replacing the glass substrate roller, increases the utilization rate of the roller, and lowers down the device maintenance cost.

The disassembleable roller structure of the roller axle assembly of the present invention can be the roller for conveying glass substrate discussed in any one or multiple embodiments given above. Repeated description will be omitted.

In practicing the roller for conveying glass substrate and the roller axle assembly according to the present invention, since the roller comprises a roller structure composed of a plurality of roller components that is assembled together, it is possible to realize disassembleable mounting to the roller axle. When a local roller is worn out, there is no need to completely disassembled and re-assembled the entire roller axle assembly and it only needs to remove the worn-out roller for replacement. This shortens the time period for replacing the glass substrate roller, increases the utilization rate of the roller, and lowers down the device maintenance cost. An elastic body is mounted t the roller to prevent insufficiency of size precision of the roller or surface unsmoothness of the roller that causes scratching of the surface of the glass substrate so that the roller provides an effect of shock absorption and cushioning.

The present invention has been described with reference to the preferred embodiments, which are not intended to constrain the scope of protection of the present invention. Variations that are considered equivalent to what described above are considered within the scope of the present invention.

What is claimed is:

1. A roller for conveying glass substrate, comprising a structure of roller body that is formed by assembling a plurality of roller components together in a disassembleable manner, an axle bore being formed in center of the roller;

wherein at least one of the plurality of roller components comprises: an outer roller rim; an axle bore section defined in the outer roller rim; and a mounting section extending from a surface of the outer roller rim in a direction along the axle bore section, wherein in assembling the plurality of roller components, the plurality of roller components are secured together through the mounting section, the outer roller rim of the plurality of roller components being assembled to form a roller rim of the structure of the roller body, the axle bore section of the plurality of roller components being assembled to form the axle bore;

wherein the mounting section forms a plurality of coupling holes for coupling the plurality of roller components;

wherein the outer roller rim and the mounting section are integrally formed together;

wherein the roller comprises two roller components that are symmetric and have semicircular ring-like cross section and fasteners are sequentially put through the coupling holes of the two roller components that correspond to each other to secure the mounting section of the two roller components;

wherein the roller has an outer circumference over which an elastic body is fit; and wherein the outer roller rim has a curved outer flange forming a receiving groove, the elastic body being received in the receiving groove.

* * * * *